Jan. 17, 1956

R. W. DOEG 2,731,314

REFRIGERATING APPARATUS

Filed Oct. 5, 1953

INVENTOR.
RALPH W. DOEG
BY
Ralph E. Baker
ATTORNEY

United States Patent Office 2,731,314
Patented Jan. 17, 1956

2,731,314
REFRIGERATING APPARATUS

Ralph W. Doeg, Detroit, Mich., assignor to Nash-Kelvinator Corporation, Detroit, Mich., a corporation of Maryland Application October 5, 1953, Serial No. 384,071

4 Claims. (Cl. 309—19)

This invention relates to refrigerating apparatus and more particularly to assemblies of piston and connecting rods forming a part of said apparatus.

It is an object of the invention to provide an improved connection for connecting a piston and connecting rod together for universal movement therebetween and for effecting wear take-up between engaging parts.

Another object of the invention is to provide for a piston and connecting rod, a universal connection which will not rattle or otherwise vibrate audibly.

Another object of the invention is to provide for piston-connecting rod assemblies an improved arrangement of the components of a universal wear take-up connection which is particularly advantageous in connecting together a hollow piston and connecting rod.

A further object of the invention is to provide a wear take-up and universal connection in which the elements thereof are arranged in a particular relationship to facilitate assembly of connecting rods and hollow pistons.

Further objects and advantages of the present invention will be apparent from the following description, reference being had to the accompanying drawings, wherein a preferred form of the present invention is clearly shown.

Figure 1:
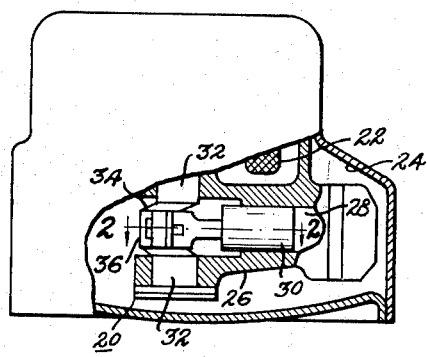
Fig. 1 is a side view of a refrigerant motor-compressor unit embodying features of my invention and showing a portion thereof broken away.
Figure 4:
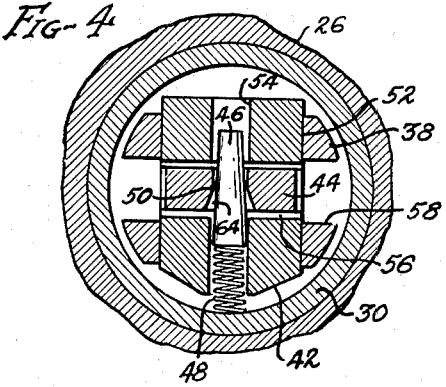
Fig. 4 is a view taken along the line 4—4 of Fig. 3.
Figure 2:
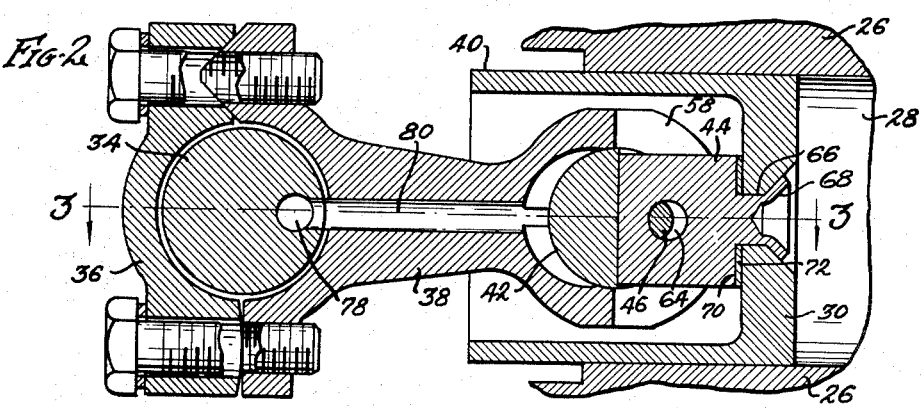
Fig. 2 is an enlarged view taken along line 2—2 of Fig. 1.

Referring to the drawings by characters of reference, my invention is illustrated in connection with a refrigerant motor-compressor apparatus which comprises, in general, a compressor 20 and an electric motor 22. These units are housed and sealed in a casing 24. The compressor 20 has a cylinder block 26 provided with a horizontal bore 28 to receive a reciprocal piston 30, and the cylinder block 26 is further provided with suitable bearings for a vertical drive shaft 32 which is driven by the electric motor 22. A crank 34 on the drive shaft 32 rotates one end or strap 36 of a connecting rod 38 which is operatively connected at the other end to the piston 30 by my universal, wear-take-up connection. The piston 30 is preferably hollow or has a skirt 40, and projecting into the piston or surrounded by the skirt is the piston connecting end of the rod 36.

My wear take-up and universal connection for piston-rod assemblies comprises in general, a wrist pin 42, an extension member 44, a wedge member or tapered pin 46, a spring 48, and a fulcrum 50. The wrist pin 42 is mounted in the rod 36; the extension 44 is rigid with the piston; and the spring 48 acting on the tapered pin 46 holds the wrist pin and extension together. In the piston end of rod 36, is a transverse bore 52 in which the wrist pin 42 is rotatable about an axis parallel to the axis of the crank 34. I utilize a wrist pin for my connection having a diameter as large as practicable so as to provide a large surface, long wearing pin, and I also use a wrist pin so as to facilitate assembly of the parts of the connection with the rod and piston.

To receive the tapered pin 46 and spring 48, I provide a bore 54 through the wrist pin 42 longitudinally of the wrist pin axis of rotation and preferably offset therefrom. At its closest point to the periphery of the wrist pin 42, the wrist pin bore 54 is intersected by a transverse slot 56, and the piston end of rod 36 is bifurcated, as at 58, to receive the extension 44 which extends into the wrist pin bore 54 through slot 56. Preferably, the end of the extension 44 is rounded, as at 60, and engages in an arcuate seat 62 formed in the wrist pin 42. A transverse opening 64 is provided through the extension 44 which registers, but does not accurately align with the wrist pin bore 54. The opening 64 is preferably made by boring a hole therethrough and then countersinking the hole whereby the edge formed by the intersection of the bores provides the fulcrum 50. As shown, the side of the tapered pin 46 engages the fulcrum 50 and an element or line surface of bore 54 opposite fulcrum 50 to effect a wedging action directed to urge and hold the wrist pin 42 and extension 44 together. Preferably the pin 46 is elliptical in cross section for effecting a good wedging action against the walls of the misaligned bores. The fulcrum 50 contacts the rounded side of the pin 46 which may rock thereon to allow for slight relative canting action of the rod 36 whereby to compensate for misalignment of parts and thus avoid undue wear of the parts. One end of spring 48 engages the larger outer end of the tapered pin 46, and the other end of spring 48 seats against the inner surface of the piston sleeve 40, an arrangement directed to facilitate assembly of the piston and connecting rod. The spring 48 is held under compression between the piston skirt and the large end of pin 46 and forces the tapered pin 46 inwardly to maintain contact between the wrist pin 42 and the piston extension 44. It will be seen that any wear of the wrist pin 42, extension 44 or pin 46 is taken up by the spring 48 so that the parts are always held tightly together.

Figure 3:
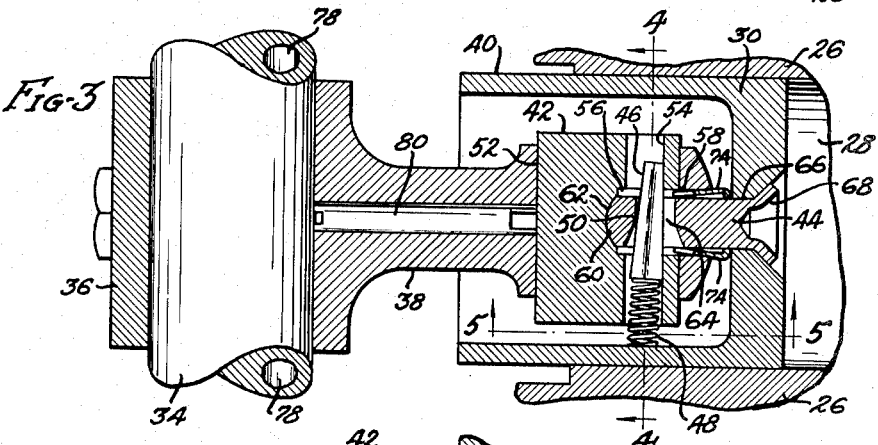
Fig. 3 is a view taken along the line 3—3 of Fig. 2.
Figure 5:
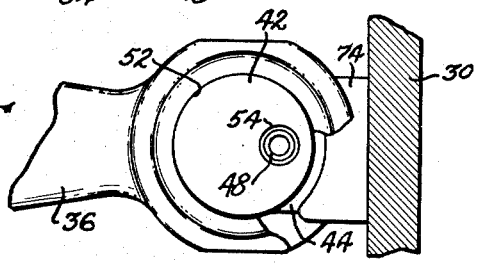
Fig. 5 is a view taken along the line 5—5 of Fig. 3.

Preferably, the piston extension 44 is formed with a shank 66 which extends through the piston 30 and has a hollow end adapted to be deformed or flared outwardly against a countersink 68 in the outer end of the piston to form a head to secure the extension and piston together. Between the extension 44 and the shank 66 is a shoulder 70, and held between this shoulder and the inner face of the piston 30 is a web 72 of a U-shaped spring clip having opposite spring fingers 74. As shown in Fig. 3, the spring clip web 92 is apertured to receive the shank of the extension 44 and the fingers 74 are positioned between opposite sides of the extension 44 and the respective opposed surfaces of the bifurcated end of rod 36. The spring fingers 74 are made at right angles to the web 72, but when assembled, the fingers are tensioned inwardly by engagement with the opposed faces of the rod bifurcated parts such that the spring fingers thrust outwardly thereagainst, thus spacing the parts to avoid friction and audible vibrations.

In assembling the connecting rod and piston, the wrist pin 42 and the extension 44 are assembled to the rod 36 with spring clip 70 in place and then the wedge pin 46 is inserted in the wrist pin bore 54 together with the compression spring 48. The piston skirt 40 is now fitted over the assembled end of the rod, the spring being manually held compressed until it clears the skirt opening and then released to seat on the side of the skirt, as shown. The shank of the extension 44 is inserted in the bore in piston 30 after which the head is formed on the outer end of the shank to secure the parts together.

Extending longitudinally through the crankshaft 34 is a lubricant passage 78 which communicates with a passage 80 in rod 36. Passage 80 extends longitudinally through the rod 36 to the wrist pin bore 52 to conduct the lubricant thereto. Lubricant is delivered through passages 78 and 80 by pumping means (not shown) driven by the compressor motor 22.

From the foregoing description, it will now be understood that I have provided an improved wear take-up and universal connection for piston-connecting rod assemblies. It will be understood that my connection makes for ready assembly of a connecting rod and piston, since, after the extension, pin and springs have been added to the connecting rod, it only necessary to place the piston over the end of the rod, release the spring and peen over the head of the extension. Furthermore I have provided a wear take-up and universal connection for connecting rod-piston assemblies in which a wrist pin is utilized for its desirable wear qualities and in addition functions as an element of the wear take-up feature and the unversal connection function. In addition, I have provided for prevention of friction and metal to metal noise in the particular universal connection herein described.

Although only a preferred form of the invention has been illustrated, and that form described in detail, it will be apparent to those skilled in the art that various modifications may be made therein without departing from the spirit of the invention or from the scope of the appended claims.

I claim:

1. In a compressor, a connecting rod having a bifurcated end intersected by a transverse bore, a wrist pin rotatable in said rod bore, said wrist pin having a bore therein extending longitudinally of the wrist pin axis, a piston having a skirt, an extension member on said piston surrounded by said skirt, said extension member received by the bifurcated end of said rod and intersecting said wrist pin bore, said extension member having a transverse opening registering with said wrist pin bore, a tapered pin extending through said opening and wrist pin bore, and a spring having one end within said wrist pin engaging said tapered pin and the other end projecting from said wrist pin engaging the inner wall surface of said piston skirt urging said tapered pin against and holding said extension member and said wrist pin together.

2. In a compressor, a connecting rod having a bifurcated end intersected by a transverse bore therethrough, a wrist pin rotatable in said bore having a bore therethrough transverse to said rod, a piston, an extension member extending from said piston and received by the bifurcated end of said rod, said extension member intersecting said wrist pin bore and having an opening registering therewith, a tapered pin extending through said opening and wrist pin bore, means acting on said pin to urge said extension member into engagement with said wrist pin, and spring means interposed between the bifurcated end of said rod and said extension member spacing said rod and extension member apart.

3. In a compressor, a connecting rod having a bifurcated end intersected by a transverse bore, a wrist pin rotatable in said bore having a bore transverse to said rod, a piston, an extension member carried by said piston extending between the sides of said bifurcated rod end, said extension member intersecting said wrist pin bore and bearing at one end against said wrist pin, said extension member having an opening registering with said wrist pin bore, a tapered pin engaging in said opening and wrist pin bore, a spring acting on said pin to urge the end of said extension member against said wrist pin, and a U-shaped spring member on said extension member having spring legs interposed between the opposed surfaces of said bifurcated rod end and the corresponding opposite sides of said extension member.

4. A universal and wear take-up connection for connecting a piston and a connecting rod together comprising, a rotatable wrist pin carried by one end of the connecting rod having a bore extending longitudinally of the wrist pin axis of rotation and intersected by an opening through the periphery of said wrist pin, an extension member attached at one end thereof to the piston, said extension member projecting through said opening into said bore and having a transverse opening registering in offset relation with the bore, an arcuate seat within said wrist pin receiving the other end of said extension member, a tapered pin member extending into said bore and second named opening, a fulcrum on one of said members engaging the other to allow limited relative canting between the wrist pin and the extension member, a spring acting on said tapered pin member urging said extension member against said seat, and a spring carried by said extension member acting on and yieldingly opposing relative canting of said wrist pin and extension member.

References Cited in the file of this patent

UNITED STATES PATENTS

| | | |
|---|---|---|
| 76,448 | Hinds et al. | Apr. 7, 1868 |
| 1,789,089 | Tobler | Jan. 13, 1931 |
| 1,921,607 | Curtis | Aug. 8, 1933 |
| 2,040,032 | Steele et al. | May 5, 1936 |
| 2,394,409 | Steenstrup | Feb. 5, 1946 |
| 2,546,045 | Scheldorf | Mar. 20, 1951 |
| 2,554,992 | Kurtz | May 29, 1951 |
| 2,644,731 | Doeg | July 7, 1953 |
| 2,664,327 | Elliott | Dec. 29, 1953 |